(12) United States Patent
Zhang et al.

(10) Patent No.: US 12,739,715 B2
(45) Date of Patent: Sep. 15, 2026

(54) METHODS AND APPARATUSES FOR DEACTIVATING AND ACTIVATING A SECONDARY CELL GROUP (SCG) IN A MULTIRADIO DUAL CONNECTIVITY (MR-DC) SCENARIO

(71) Applicant: Lenovo (Beijing) Limited, Beijing (CN)

(72) Inventors: Congchi Zhang, Shanghai (CN); Mingzeng Dai, Shanghai (CN); Lianhai Wu, Beijing (CN); Le Yan, Shanghai (CN)

(73) Assignee: Lenovo (Beijing) Limited, Beijing (CN)

( * ) Notice: Subject to any disclaimer, the term of this patent is extended or adjusted under 35 U.S.C. 154(b) by 377 days.

(21) Appl. No.: 18/269,498

(22) PCT Filed: Dec. 24, 2020

(86) PCT No.: PCT/CN2020/139028

§ 371 (c)(1),
(2) Date: Jun. 23, 2023

(87) PCT Pub. No.: WO2022/133905

PCT Pub. Date: Jun. 30, 2022

(65) Prior Publication Data

US 2024/0147332 A1 May 2, 2024

(51) Int. Cl.
*H04W 36/04* (2009.01)
*H04W 36/30* (2009.01)
*H04W 76/27* (2018.01)

(52) U.S. Cl.
CPC ......... *H04W 36/04* (2013.01); *H04W 36/305* (2018.08); *H04W 76/27* (2018.02)

(58) Field of Classification Search
CPC ... H04W 36/04; H04W 36/305; H04W 76/27; H04W 52/0206; H04W 76/19; H04W 52/0258; H04W 52/0216; Y02D 30/70
See application file for complete search history.

(56) References Cited

U.S. PATENT DOCUMENTS

2016/0044744 A1 2/2016 Lee
2019/0090227 A1* 3/2019 Tsai .................... H04W 72/046
(Continued)

FOREIGN PATENT DOCUMENTS

CN 111526566 A 8/2020

OTHER PUBLICATIONS

Huawei , "[Post111-e][919][eDCCA] Efficient activation deactivation of SCG Discussion on SCG deactivation and activation", 3GPP TSG-RAN WG2#112-e, R2-2010123, Online [retrieved Aug. 8, 2023]. Retrieved from the Internet <https://www.3gpp.org/ftp/TSG_RAN/WG2_RL2/TSGR2_112-e/Docs>., Nov. 2020, 20 Pages.
(Continued)

*Primary Examiner* — Hashim S Bhatti
(74) *Attorney, Agent, or Firm* — FIG. 1 Patents

(57) ABSTRACT

Embodiments of the present application relate to methods and apparatuses for deactivating and activating a secondary cell group (SCG) in a multi-radio dual connectivity (MR-DC) scenario under a 3rd Generation Partnership Project (3GPP) 5G New Radio (NR) system or the like. According to an embodiment of the present application, a method can include: in response to determining to activate a SCG, transmitting state information for one or more secondary cells (SCells), wherein the one or more SCells are associated with the SCG; and in response to determining to deactivate the SCG, transmitting the state information for the one or more SCells and transmitting configuration information regarding a behaviour of a user equipment (UE).

20 Claims, 4 Drawing Sheets

(56) References Cited

U.S. PATENT DOCUMENTS

| | | | | |
|---|---|---|---|---|
| 2019/0190682 | A1* | 6/2019 | Kadiri | H04L 5/0053 |
| 2020/0204312 | A1 | 6/2020 | Ku et al. | |
| 2021/0013951 | A1* | 1/2021 | Chen | H04W 76/19 |
| 2022/0116874 | A1* | 4/2022 | Xu | H04W 52/0229 |
| 2023/0362817 | A1* | 11/2023 | Da Silva | H04W 24/10 |
| 2023/0413333 | A1* | 12/2023 | Tsuboi | H04W 76/15 |
| 2024/0007840 | A1* | 1/2024 | Xu | H04W 36/00 |

OTHER PUBLICATIONS

PCT/CN2020/139028 , "International Preliminary Report on Patentability", PCT Application No. PCT/CN2020/139028, Jul. 6, 2023, 5 pages.

PCT/CN2020/139028 , "International Search Report and Written Opinion", PCT Application No. PCT/CN2020/139028, Sep. 24, 2021, 6 pages.

ZTE , et al., "Framework of SCG deactivation and activation", 3GPP TSG-RAN WG2 Meeting #111 electronic, R2-2006900, e-meeting [retrieved Aug. 8, 2023]. Retrieved from the Internet <https://www.3gpp.org/ftp/TSG_RAN/WG2_RL2/TSGR2_111-e/Docs/>., Aug. 2020, 6 Pages.

209664770.0 , "Extended European Search Report", EP Application No. 209664770.0, Sep. 27, 2024, 10 pages.

CATT , "Dormant SCG state", 3GPP TSG-RAN WG2 Meeting #107bis, R2-1912118, Chongqing, P.R.China, Oct. 2019, 4 pages.

Vivo , "Activation and deactivation mechanism for SCG and SCells", 3GPP TSG-RAN WG2 Meeting #112 electronic, R2-2010290, Online, Nov. 2020, 7 pages.

Foreign Office Action issued in CN 202080108028.0, mailed May 27, 2026, 16 pages.

* cited by examiner

METHODS AND APPARATUSES FOR DEACTIVATING AND ACTIVATING A SECONDARY CELL GROUP (SCG) IN A MULTIRADIO DUAL CONNECTIVITY (MR-DC) SCENARIO

TECHNICAL FIELD

Embodiments of the present application generally relate to wireless communication technology, especially to methods and apparatuses for deactivating and activating a secondary cell group (SCG) in a multi-radio dual connectivity (MR-DC) scenario.

BACKGROUND

Next generation radio access network (NG-RAN) supports a MR-DC scenario. In a MR-DC scenario, a user equipment (UE) with multiple transceivers may be configured to utilize resources provided by two different nodes connected via non-ideal backhauls. Wherein one node may provide new radio (NR) access and the other one node may provide either evolved-universal mobile telecommunication system (UMTS) terrestrial radio access (UTRA) (E-UTRA) or NR access. One node may act as a master node (MN) and the other node may act as a secondary node (SN). The MN and SN are connected via a network interface (for example, Xn interface as specified in 3rd Generation Partnership Project (3GPP) standard documents), and at least the MN is connected to the core network.

Currently, details regarding a SCG deactivation mechanism and a SCG activation mechanism in a MR-DC scenario have not been discussed in 3GPP 5G technology yet.

SUMMARY

Some embodiments of the present application provide a method for wireless communications. The method may be performed by a MN or a SN. The method includes: in response to determining to activate a SCG, transmitting state information for one or more secondary cells (SCells), wherein the one or more SCells are associated with the SCG; and in response to determining to deactivate the SCG, transmitting the state information for the one or more SCells and transmitting configuration information regarding a behaviour of a UE.

Some embodiments of the present application also provide an apparatus for wireless communications. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the above-mentioned method performed by a MN or a SN.

Some embodiments of the present application provide a further method for wireless communications. The method may be performed by a UE. The method includes: receiving a radio resource control (RRC) reconfiguration message, wherein the RRC reconfiguration message includes state information for one or more SCells, and wherein the one or more SCells are associated with a SCG; and transmitting a RRC reconfiguration complete message.

Some embodiments of the present application also provide an apparatus for wireless communications. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the above-mentioned method performed by a UE.

The details of one or more examples are set forth in the accompanying drawings and the descriptions below. Other features, objects, and advantages will be apparent from the descriptions and drawings, and from the claims.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8 and so on. It is contemplated that along with developments of network architectures and new service scenarios, all embodiments in the present application are also applicable to similar technical problems; and moreover, the terminologies recited in the present application may change, which should not affect the principle of the present application.

Figure 1:
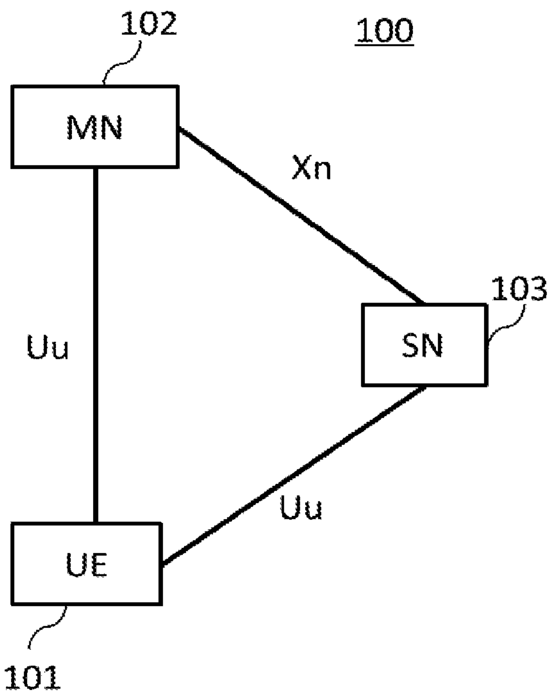
FIG. 1 illustrates a schematic diagram of a wireless communication system in accordance with some embodiments of the present application.

FIG. 1 illustrates a schematic diagram of a wireless communication system in accordance with some embodiments of the present application.

As shown in FIG. 1, the wireless communication system 100 may be a dual connectivity system 100, including at least one UE 101, at least one MN 102, and at least one SN 103. In particular, the dual connectivity system 100 in FIG. 1 includes one shown UE 101, one shown MN 102, and one shown SN 103 for illustrative purpose. Although a specific number of UEs 101, MNs 102, and SNs 103 are depicted in FIG. 1, it is contemplated that any number of UEs 101, MNs 102, and SNs 103 may be included in the wireless communication system 100.

Referring to FIG. 1, UE 101 may be connected to MN 102 and SN 103 via a network interface, for example, the Uu interface as specified in 3GPP standard documents. MN 102 and SN 103 may be connected with each other via a network interface, for example, the Xn interface as specified in 3GPP standard documents. MN 102 may be connected to the core network via a network interface (not shown in FIG. 1). UE 102 may be configured to utilize resources provided by MN 102 and SN 103 to perform data transmission.

MN 102 may refer to a radio access node that provides a control plane connection to the core network. In an embodiment of the present application, in the E-UTRA-NR Dual Connectivity (EN-DC) scenario, MN 102 may be an eNB. In another embodiment of the present application, in the next generation E-UTRA-NR Dual Connectivity (NGEN-DC) scenario, MN 102 may be an ng-eNB. In yet another embodiment of the present application, in the NR-E-UTRA Dual Connectivity (NE-DC) scenario or the NR-NR Dual Connectivity (NR-DC) scenario, MN 102 may be a gNB.

MN 102 may be associated with a MCG. The MCG may refer to a group of serving cells associated with MN 102, and may include a primary cell (PCell) and optionally one or more SCells of the MCG. The PCell may provide a control plane connection to UE 101.

SN 103 may refer to a radio access node without a control plane connection to the core network but providing additional resources to UE 101. In an embodiment of the present application, in the EN-DC scenario, SN 103 may be an en-gNB. In another embodiment of the present application, in the NE-DC scenario, SN 103 may be a ng-eNB. In yet another embodiment of the present application, in the NR-DC scenario or the NGEN-DC scenario, SN 103 may be a gNB.

SN 103 may be associated with a SCG. The SCG may refer to a group of serving cells associated with SN 103, and may include a primary secondary cell (PSCell) and optionally one or more SCells. The PCell of the MCG and the PSCell of the SCG may also be referred to as a special cell (SpCell).

In some embodiments of the present application, UE 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. In some other embodiments of the present application, UE 101 may include a portable wireless communication device, a smart phone, a cellular telephone, a flip phone, a device having a subscriber identity module, a personal computer, a selective call receiving circuitry, or any other device that is capable of sending and receiving communication signals on a wireless network. In some other embodiments of the present application, UE 101 may include wearable devices, such as smart watches, fitness bands, optical head-mounted displays, or the like. Moreover, UE 101 may be referred to as a subscriber unit, a mobile, a mobile station, a user, a terminal, a mobile terminal, a wireless terminal, a fixed terminal, a subscriber station, a user terminal, or a device, or described using other terminology used in the art.

Currently, agreements of 3GPP standard documents regarding a SCell activation procedure or a SCell deactivation procedure are as follows. To enable reasonable UE battery consumption when carrier aggregation (CA) is configured, an activation/deactivation mechanism of Cells is supported. When a SCell is deactivated, a UE does not need to receive the corresponding physical downlink control channel (PDCCH) or physical downlink shared channel (PDSCH), cannot transmit in the corresponding uplink, nor is it required to perform channel quality indicator (CQI) measurements. Conversely, when a SCell is active, the UE shall receive PDSCH and PDCCH (if the UE is configured to monitor PDCCH from this SCell) and is expected to be able to perform CQI measurements.

As specified in 3GPP Release 17 Work Item on NR support of efficient SCG activation or deactivation procedure in a MR-DC scenario, in EN-DC deployment, power consumptions of a UE and a network is a big issue, due to simultaneously maintaining two radio links. In some cases, a NR UE's power consumption is 3 to 4 times higher than a LTE UE's power consumption. In EN-DC deployment, a MN provides the basic coverage. When a UE's data rate requirement changes dynamically, e.g., from high to low, a SN is worth considering to be (de)activated to save energy consumptions of the network and the UE.

For example, during a SCG deactivation procedure, there is an issue related to a radio link monitoring (RLM) measurement operation and a beam failure detection operation or a beam failure recovery operation. For example, when a SCG is deactivated, a UE will stop monitoring the associated PDCCH but continue performing a radio resource management (RRM) measurements operation. However, it is still unclear whether to support other operations (such as, at least one of "a RLM measurement operation" and "a beam failure detection operation" and "a beam failure recovery operation") during the SCG deactivation procedure. On one hand, the RLM measurement operation and the beam failure detection or recovery operation consume a UE's power, and thus these operations should be avoided as much as possible. On the other hand, the RLM measurement operation and the beam failure detection or recovery operation are beneficial for the UE to monitor the link quality timely and may reduce the chance of the RLF when the SCG is activated again.

In addition, there is an issue related to state(s) of SCell(s) (i.e., activated, deactivated, or dormant) when a SCG is activated or deactivated. In general, there are three types of states defined for SCell(s), i.e., an activated state, a deactivated state, and a dormant state. When a SCG is activated or deactivated, it is unclear whether associated SCell(s) should stay in its old state or enter a new state. In one example, for a dormant SCell, when the associated SCG is activated or deactivated, it is unclear whether the dormant SCell should stay in the dormant state or enter an activated or deactivated state. In a further example, when a SCG is activated, it is unclear whether all relevant SCells should be activated or only a subset of SCells are activated. Following the spirit of a legacy 3GPP standard, when a SCG is activated, all relevant SCells could be by default set to an activated state, and a SN could set specific SCells to a deactivated or dormant state later using a SCell activation medium access control (MAC) control elements (CE) or a SCell deactivation MAC CE. However, this approach creates signaling overhead and latency.

In general, a SCG (de)activation procedure can be initiated by a MN, a SN, or a UE. Currently, an exact mechanism to support a MN initiated SCG (de)activation procedure, a SN initiated SCG (de)activation procedure, or a UE initiated SCG (de)activation procedure is unclear. Specific mechanisms are needed to (de)activate a SCG in an efficient way.

Some embodiments of the present application provide a SCG (de)activation mechanism in a MR-DC scenario in 3GPP 5G NR system or the like in an efficient way. Some embodiments of the present application provide mechanisms to support flexible or configurable UE's behavior during a SCG deactivation procedure, to balance tradeoff between power assumption and accurate or timely radio link monitoring. Some embodiments of the present application provide mechanisms to support SCell states configuration during a SCG (de)activation procedure to save signaling overhead and facilitate efficient SCG activation or deactivation procedure. More details will be illustrated in the following text in combination with the appended drawings.

Figure 2:
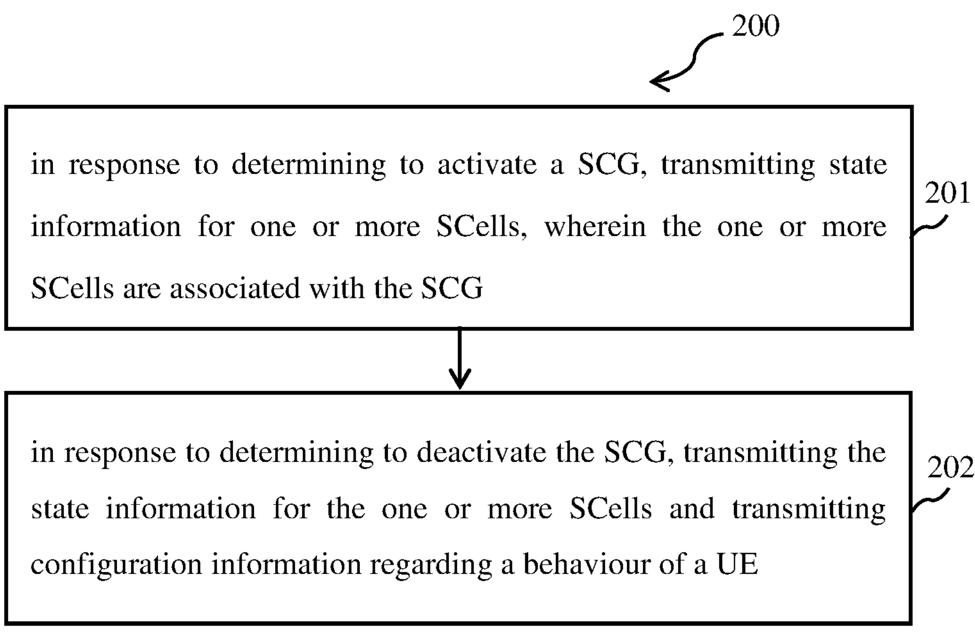
FIG. 2 illustrates a flow chart of a method for transmitting state information for SCell(s) in accordance with some embodiments of the present application.

FIG. 2 illustrates a flow chart of a method for transmitting state information for SCell(s) in accordance with some embodiments of the present application. The exemplary method 200 in the embodiments of FIG. 2 may be performed by:

a MN (e.g., MN 102, MN 320, MN 420, MN 520, or MN 620 as shown and illustrated in any of FIGS. 1 and 3-6); or a SN (e.g., SN 103, SN 330, SN 430, SN 530 or SN 630 as shown and illustrated in any of FIGS. 1 and 3-6).

Although described with respect to a MN or a SN, it should be understood that other device(s) may be configured to perform the method as shown and illustrated in FIG. 2. The embodiments of FIG. 2 assume that a MN and a SN may be combined in any one of EN-DC, NGEN-DC, NE-DC, and NR-DC scenarios. Following definitions are assumed in the embodiments of FIG. 2:

Fast MCG link recovery: in a MR-DC scenario, a RRC procedure where the UE sends an MCG Failure Information message to the MN via the SCG upon the detection of a radio link failure on the MCG.

Master Cell Group: in a MR-DC scenario, a group of serving cells associated with the Master Node, comprising of the SpCell (PCell) and optionally one or more SCells.

Secondary Cell Group: in a MR-DC scenario, a group of serving cells associated with the Secondary Node, comprising of the SpCell (PSCell) and optionally one or more SCells.

Secondary node: in a MR-DC scenario, the radio access node, with no control plane connection to the core network, providing additional resources to the UE. It may be an en-gNB (in EN-DC), a Secondary ng-eNB (in NE-DC) or a Secondary gNB (in NR-DC and NGEN-DC).

SCG bearer: in a MR-DC scenario, a radio bearer with an RLC bearer (or two RLC bearers, in case of CA packet duplication in an E-UTRAN cell group, or up to four RLC bearers in case of CA packet duplication in a NR cell group) only in the SCG.

SpCell: a primary cell of a master or secondary cell group.

signaling radio bearer (SRB) 3: in EN-DC, NGEN-DC and NR-DC, a direct SRB between the SN and the UE.

Split bearer: in a MR-DC scenario, a radio bearer with RLC bearers both in MCG and SCG.

In the exemplary method 200 as shown in FIG. 2, in operation 201, in response to determining to activate a SCG, the MN or the SN transmits state information for SCell(s). The SCell(s) indicates one or more SCells and is associated with the SCG.

According to some embodiments, the state information for the SCell(s) includes at least one of:

(1) an activated state of a SCell within the SCell(s);

(2) a deactivated state of a SCell within the SCell(s); and (3) a dormant state of a SCell within the SCell(s).

In one example, the state information for the SCell(s) includes an activated state of one SCell within the SCell(s), a deactivated state of a further SCell within the SCell(s), and a dormant state of another three SCells within the SCell(s). In a further example, the state information for the SCell(s) includes an activated state of two SCells within the SCell(s) and a deactivated state of one SCell within the SCell(s). In another example, the state information for the SCell(s) includes an activated state of four SCells within the SCell(s) and a deactivated state of three SCell within the SCell(s), and a dormant state of one SCell within the SCell(s).

Figure 3:
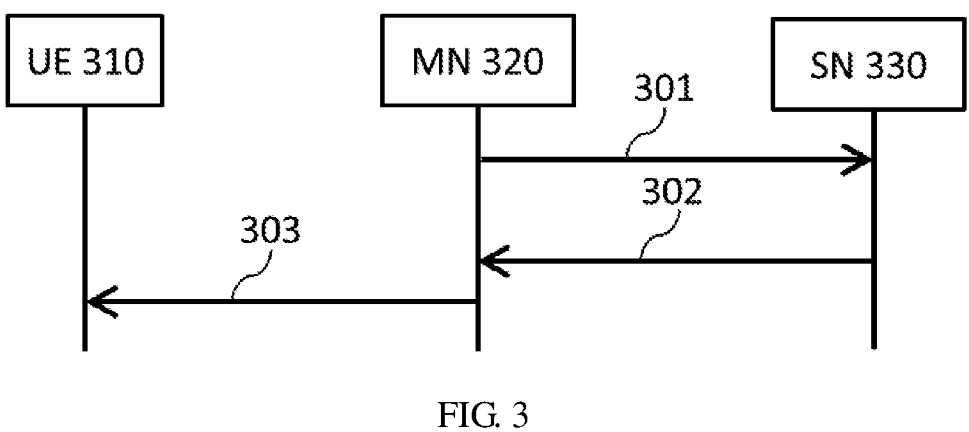
FIG. 3 illustrates an exemplary flowchart of a MN initiated SCG deactivation procedure in accordance with some embodiments of the present application.
Figure 4:
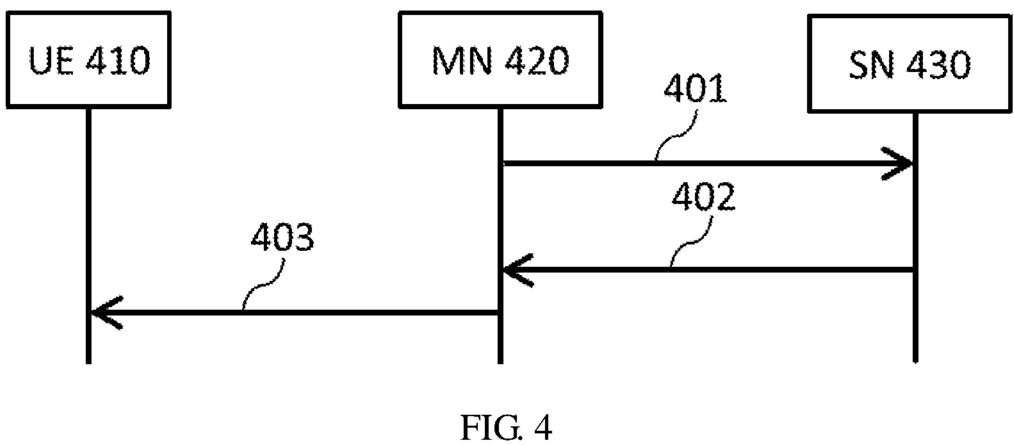
FIG. 4 illustrates an exemplary flowchart of a MN initiated SCG activation procedure in accordance with some embodiments of the present application.
Figure 5:
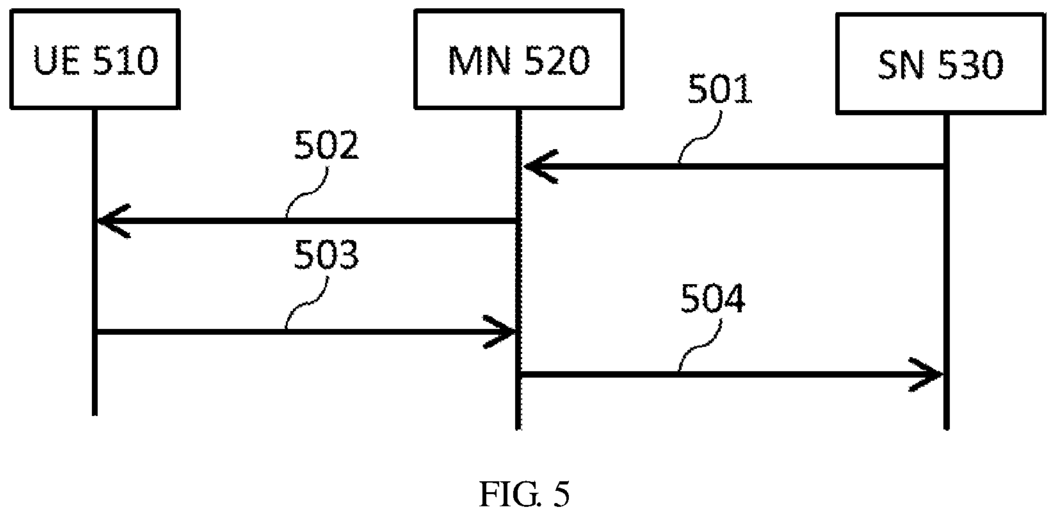
FIG. 5 illustrates an exemplary flowchart of a SN initiated SCG deactivation procedure in accordance with some embodiments of the present application.
Figure 6:
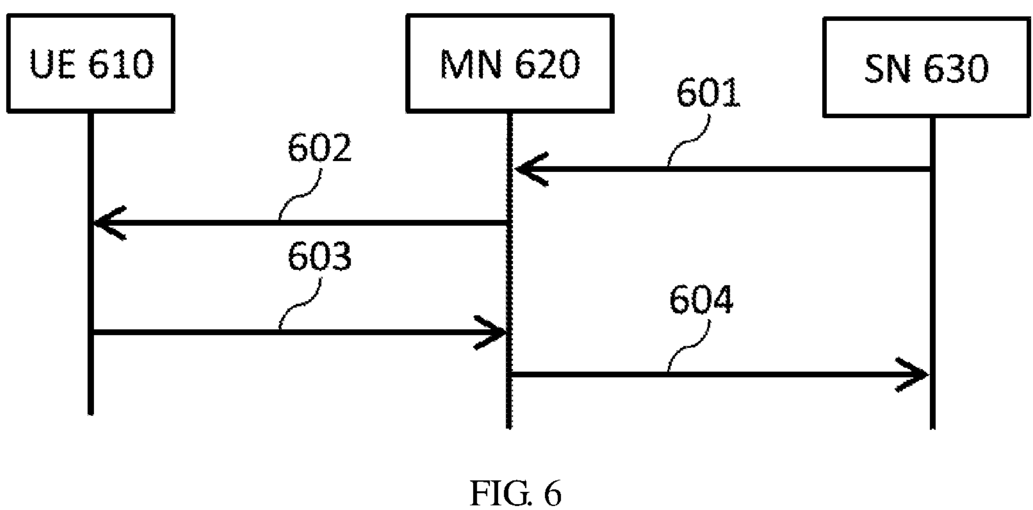
FIG. 6 illustrates an exemplary flowchart of a SN initiated SCG activation procedure in accordance with some embodiments of the present application.

According to some embodiments, in operation 201, the state information for the SCell(s) may be transmitted in at least one of:

(1) a Xn interface message including configuration information regarding the SCG (specific embodiments are shown in FIGS. 3 and 4);

(2) a Xn interface message initiating a SCG deactivation procedure and including the configuration information regarding the SCG (specific embodiments are shown in FIG. 5);

(3) a Xn interface message initiating a SCG activation procedure and including the configuration information regarding the SCG (specific embodiments are shown in FIG. 6); and (4) a RRC message (specific embodiments are shown in FIGS. 3-6). The RRC message may initiate the SCG deactivation procedure or the SCG activation procedure.

In one example, the RRC message is directly transmitted from the SN to the UE if signaling radio bearer 3 (SRB3) is configured. In a further example, the RRC message is transmitted from the MN to the UE if SRB3 is not configured.

The RRC message may be a RRC reconfiguration message transmitted from the MN to the UE. In one embodiment, the RRC reconfiguration message is generated by the MN and includes information provided by the SN. In a further embodiment, the RRC reconfiguration message is generated by the SN as a container and forwarded from the SN to the MN. For instance, the container is an OCTET string container.

In particular, in an embodiment, in case of a MN initiated SCG (de)activation procedure, the state information for the SCell(s) can be included in one of:

the same Xn interface message (e.g., SN Modification Request Acknowledge Message), which provides relevant SCG configuration, sent from the SN to the MN.

the same RRC message (e.g., RRCReconfiguration Message), which is used to activate or deactivate the SCG, sent from the MN to the UE.

If SRB3 is configured, the same RRC message (e.g., RRCReconfiguration Message), which is used to activate or deactivate the SCG, sent from the SN to the UE.

In a further embodiment, in case of a SN initiated SCG (de)activation procedure, the state information for the SCell(s) can be included in one of:

the same Xn interface message (e.g., SN Modification Required message), which initiates the SCG activation or deactivation procedure as well as relevant SCG configuration, sent from the SN to the MN.

The same RRC message (e.g., RRCReconfiguration Message), which is used to activate or deactivate the SCG, sent from the MN to the UE.

If SRB3 is configured, the same RRC message (e.g., RRCReconfiguration Message), which is used to activate or deactivate the SCG, sent from the SN to the UE.

According to some embodiments, the state information for the SCell(s) includes one of following contents:

(1) A mapping relationship between: each SCell of the SCell(s), and a target state of each SCell of the SCell(s) after activating the SCG.

(2) A mapping relationship between: each SCell of the SCell(s), a target state of each SCell of the SCell(s) after deactivating the SCG, and the configuration information regarding the UE's behaviour(s).

(3) A mapping relationship between: each SCell in a subset of the SCell(s), and a target state of each SCell in the subset of the SCell(s) after activating the SCG.

(4) A mapping relationship between: each SCell in a further subset of the SCell(s), a target state of each SCell in the further subset of the SCell(s) after deactivating the SCG, and the configuration information regarding the UE's behaviour(s).

The abovementioned "a subset of the SCell(s)" and "a further subset of the SCell(s)" may refer to the same subset of the SCell(s) under some cases or different subsets of the SCell(s) under some other cases.

In some embodiments, if the MN or the SN determines to activate the SCG, each SCell in the subset of the SCell(s) changes, from a state before activating the SCG, to the target state of each SCell in the subset of the SCell(s) after activating the SCG. In some other embodiments, if the MN or the SN determines to deactivate the SCG, each SCell in the further subset of the SCell(s) changes, from a state before deactivating the SCG, to the target state of each SCell in the further subset of the SCell(s) after deactivating the SCG. In short, in the above mapping relationships, the target state of each SCell indicates a new state, to which each SCell aims to be changed from the current state before (de) activating the SCG, after (de)activating the SCG. The target state of each SCell may also be named as a new state or the like.

According to some embodiments, the state information for the SCell(s) is decided by the SN. For example, when a SCG (de)activation procedure is initiated by a MN or a SN, the state information for the SCell(s) is decided by the SN and provided to a UE (via the MN if SRB3 is not configured) in at least one of following formats:

A list or a mapping relationship of all SCell(s) associated with the SCG and all SCell(s)'s states with relevant configurations (e.g., sCellDeactivationTimer).

A list or a mapping relationship of a subset of SCell(s) whose state(s) to be changed and these SCell(s)'s new states with relevant configurations (e.g., sCellDeactivationTimer).

In an example, when the SN decides to activate a SCG, the SN can configure some SCell(s) to stay in a deactivated state or a dormant state when the SCG is activated.

Referring back to FIG. 2, in operation 202, in response to determining to deactivate the SCG, the MN or the SN transmits the state information for the SCell(s) and transmits configuration information regarding behaviour(s) of a UE (e.g., UE 101, UE 310, UE 410, UE 510, or UE 610, as shown and illustrated in any of FIGS. 1 and 3-6).

According to some embodiments, the UE's behaviour(s) is configurable during a SCG deactivation procedure. In an embodiment, when the MN or the SN deactivates the SCG, the MN or the SN indicates, to the UE, at least one of following configuration information regarding the UE's behaviour(s):

(1) Information indicating whether the UE performs a RLM measurement operation when the SCG is deactivated.

(2) Configuration information regarding the RLM measurement operation. For example, the configuration information regarding the RLM measurement operation includes information of a bandwidth part (BWP) to be measured.

(3) A condition to start performing the RLM measurement operation (e.g., RLM_RSRP_threhold).

(4) Information indicating whether the UE performs a beam failure detection operation when the SCG is deactivated.

(5) Configuration information regarding the beam failure detection operation. For example, the configuration information regarding the beam failure detection operation indicates that the beam failure detection operation is at least one of "a synchronization signal block (SSB) based beam failure detection operation" and "a channel state information reference signal (CSI-RS) based beam failure detection operation."

(6) A condition to start performing the beam failure detection operation (e.g., BFD_RSRP_threshold).

(7) Information indicating whether the UE performs a beam failure recovery operation when the SCG is deactivated.

(8) Configuration information regarding the beam failure recovery operation.

(9) A condition to start performing the beam failure recovery operation.

According to some embodiments, the configuration information regarding the UE's behaviour(s) is transmitted in at least one of:

(1) A Xn interface message including configuration information regarding the SCG (specific embodiments are shown in FIGS. 3 and 4).

(2) A Xn interface message initiating a SCG deactivation procedure and including the configuration information regarding the SCG (specific embodiments are shown in FIGS. 5 and 6).

(3) A RRC message (specific embodiments are shown in FIGS. 3-6). The RRC message may initiate the SCG (de)activation procedure. In one example, the RRC message is directly transmitted from the SN to the UE in response to SRB3 being configured. In a further example, the RRC message is transmitted from the MN to the UE in response to the SRB3 being not configured. The RRC message may be a RRC reconfiguration message (e.g., RRCReconfiguration Message) transmitted from the MN to the UE. In one embodiment, the RRC reconfiguration message is generated by the MN and includes information provided by the SN. In a further embodiment, the RRC reconfiguration message is generated by the SN as a container and forwarded from the SN to the MN. For instance, the container is an OCTET string container.

In particular, in an embodiment, in case of a MN initiated SCG deactivation procedure, the configuration information regarding the UE's behaviour(s) is transmitted in at least one of:

The same Xn interface message (e.g., SN Modification Request Acknowledge Message), which provides relevant SCG configuration, sent from the SN to the MN.

The same RRC message (e.g., RRCReconfiguration Message), which is used to deactivate the SCG, sent from the MN to the UE.

If SRB3 is configured, the same RRC message (e.g., RRCReconfiguration Message), which is used to deactivate the SCG, sent from SN to UE.

In a further embodiment, in case of a SN initiated SCG deactivation procedure, the configuration information regarding the UE's behaviour(s) is transmitted in at least one of:

The same Xn interface message (e.g., SN Modification Required message), which initiates the SCG deactivation procedure as well as relevant SCG configuration information, sent from the SN to the MN.

The same RRC message (e.g., RRCReconfiguration Message), which is used to deactivate the SCG, sent from the MN to the UE.

If SRB3 is configured, the same RRC message (e.g., RRCReconfiguration Message), which is used to deactivate the SCG, sent from the SN to the UE.

In another embodiment, when the SCG is deactivated, the UE by default continues the RRM measurement operation. When the RRM measurement operation indicates that the current link quality is worse than a configured threshold (e.g., RSRP<RLM_RSRP_threshold), the UE starts a RLM measurement operation. When the RRM measurement operation indicates that the current link quality is the same as or better than a configured threshold (e.g., RSRP>RLM_RSRP_threshold), the UE stops the RLM measurement operation.

Similarly, when the RRM measurement operation indicates that the current link quality is worse than a configured threshold (e.g., RSRP<BFD_RSRP_threshold), the UE starts a beam failure detection operation. When the RRM measurement operation indicates that the current link quality is the same as or better than a configured threshold (e.g., RSRP>BFD_RSRP_threshold), the UE stops the beam failure detection operation or the beam failure recovery operation.

In yet another embodiment, the RRC message (e.g., RRCReconfiguration Message), which is used to deactivate the SCG, sent from the MN to the UE can be:

a RRC message generated by the MN, which includes the information provided by the SN over Xn interface; or a RRC message generated by the SN and sent to the MN as a container (i.e., an octet string). In this case, the MN only forwards the received RRC message container from the SN to the UE, without making any process to the received RRC message container.

Details described in all other embodiments of the present application (for example, details of a SCG (de)activation mechanism in a MR-DC scenario) are applicable for the embodiments of FIG. 2. Moreover, details described in the embodiments of FIG. 2 are applicable for all the embodiments of FIGS. 1 and 3-8.

FIG. 3 illustrates an exemplary flowchart of a MN initiated SCG deactivation procedure in accordance with some embodiments of the present application.

As shown in FIG. 3, in operation 301, MN 320 (e.g., MN 102 as illustrated and shown in FIG. 1) transmits SN Modification Request Message, which includes a SCG deactivation indicator, to SN 330 (e.g., SN 103 as illustrated and shown in FIG. 1). The SCG deactivation indicator is for initiating a SCG deactivation procedure. In other words, the SCG deactivation indicator is used to deactivate the SCG.

In operation 302, SN 330 transmits response information to MN 320. For instance, the response information may include: an acknowledgement for the SCG deactivation procedure; or a rejection for the SCG deactivation procedure. If the response information includes the acknowledgement for the SCG deactivation procedure, MN 320 may transmit, to UE 310 (e.g., UE 101 as illustrated and shown in FIG. 1), state information for SCell(s) associated with the SCG and configuration information regarding behaviour(s) of UE 310.

In one example, SN 330 transmits, to MN 320, SN Modification Request Acknowledge Message, which includes at least one of "state information for the SCell(s) associated with the SCG" and "SCG deactivation configuration information". The SN Modification Request Acknowledge Message indicates an acknowledgement for the SCG deactivation procedure. For instance, the SN Modification Request Acknowledge Message includes the state information for the SCell(s) as shown and illustrated above in the embodiments of FIG. 2. For example, the state information may include a deactivated state of a SCell within the SCell(s). The SCG deactivation configuration information in the SN Modification Request Acknowledge Message is associated with the SCG deactivation procedure. The SCG deactivation configuration information may include configuration information regarding behaviour(s) of UE 310.

In operation 303, MN 320 transmits RRCReconfiguration Message to UE 310. The RRCReconfiguration Message includes at least one of "the state information for the SCell(s)" and "the SCG deactivation configuration information". For example, the RRCReconfiguration Message includes the configuration information regarding the behaviour(s) of UE 310.

According to an embodiment, the RRCReconfiguration Message, which is used to deactivate the SCG, sent from MN 320 to UE 310 may be:

a RRC message generated by MN 320, which includes the information provided by SN 330 over Xn interface; or a RRC message generated by SN 330 and sent to MN 320 as a container (i.e., an octet string). In this case, MN 320 only forwards the received RRC message container from SN 330 to UE 310, without making any process to the received RRC message container.

Details described in all other embodiments of the present application (for example, details of a SCG deactivation mechanism in a MR-DC scenario) are applicable for the embodiments of FIG. 3. Moreover, details described in the embodiments of FIG. 3 are applicable for all the embodiments of FIGS. 1, 2, and 4-8.

FIG. 4 illustrates an exemplary flowchart of a MN initiated SCG activation procedure in accordance with some embodiments of the present application.

As shown in FIG. 4, in operation 401, MN 420 (e.g., MN 102 as illustrated and shown in FIG. 1) transmits SN Modification Request Message, which includes a SCG activation indicator, to SN 430 (e.g., SN 103 as illustrated and shown in FIG. 1). The SCG activation indicator is an indicator for initiating a SCG activation procedure. In other words, the SCG activation indicator is used to activate the SCG.

In operation 402, SN 430 transmits response information to MN 420. For instance, the response information may include: an acknowledgement for the SCG activation procedure or a rejection for the SCG activation procedure. If the response information includes the acknowledgement for the SCG activation procedure, MN 420 may transmit, to UE 410 (e.g., UE 101 as illustrated and shown in FIG. 1), state information for SCell(s) which are associated with the SCG.

In one example, SN 430 transmits, to MN 420, SN Modification Request Acknowledge Message, which includes state information for the SCell(s) associated with the SCG. The SN Modification Request Acknowledge Message indicates an acknowledgement for the SCG activation procedure. The SN Modification Request Acknowledge Message may include the state information for the SCell(s) as shown and illustrated above in the embodiments of FIG. 2. For instance, the state information includes an activated state of a SCell within the SCell(s).

In operation 403, MN 420 transmits RRCReconfiguration Message, which includes the state information for the SCell(s), to UE 410. Optionally, the RRCReconfiguration Message may further include an explicit indicator to activate the SCG (i.e., an indicator for initiating a SCG activation procedure).

Details described in all other embodiments of the present application (for example, details of a SCG activation mechanism in a MR-DC scenario) are applicable for the embodiments of FIG. 4. Moreover, details described in the embodiments of FIG. 4 are applicable for all the embodiments of FIGS. 1-3 and 5-8.

FIG. 5 illustrates an exemplary flowchart of a SN initiated SCG deactivation procedure in accordance with some embodiments of the present application.

As shown in FIG. 5, in operation 501, SN 530 (e.g., SN 103 as illustrated and shown in FIG. 1) transmits SN Modification Required Message, which includes at least one of "state information for SCell(s)" and "SCG deactivation configuration information", to MN 520 (e.g., MN 102 as illustrated and shown in FIG. 1). The SN Modification Required Message may include the state information for SCell(s) as shown and illustrated above in the embodiments of FIG. 2. For example, the state information for the SCell(s) includes a deactivated state of a SCell within the SCell(s). For instance, the SCG deactivation configuration information may include configuration information regarding behaviour(s) of UE 510 (e.g., UE 101 as illustrated and shown in FIG. 1).

In operation 502, MN 520 transmits RRCReconfiguration Message to UE 510. The RRCReconfiguration Message includes the SCG deactivation configuration information and the state information for the SCell(s).

In operation 503, UE 510 transmits RRCReconfiguration-Complete Message to MN 520. In operation 504, MN 520 transmits SN Modification Confirm Message to SN 530.

According to an embodiment, the RRCReconfiguration Message, which is used to deactivate the SCG, sent from MN 520 to UE 510 can be:

a RRC message generated by MN 520, which includes the information provided by SN 530 over Xn interface; or a RRC message generated by SN 530 and sent to MN 520 as a container (i.e., an octet string). In this case, MN 520 only forwards the received RRC message container from SN 530 to UE 510, without making any process to the received RRC message container.

Details described in all other embodiments of the present application (for example, details of a SCG deactivation mechanism in a MR-DC scenario) are applicable for the embodiments of FIG. 5. Moreover, details described in the embodiments of FIG. 5 are applicable for all the embodiments of FIGS. 1-4 and 6-8.

FIG. 6 illustrates an exemplary flowchart of a SN initiated SCG activation procedure in accordance with some embodiments of the present application.

As shown in FIG. 6, in operation 601, SN 630 (e.g., SN 103 as illustrated and shown in FIG. 1) transmits SN Modification Required Message, which includes state information for SCell(s) to activate SCG, to MN 620 (e.g., MN 102 as illustrated and shown in FIG. 1). The SN Modification Required Message includes the state information for SCell(s) as shown and illustrated above in the embodiments of FIG. 2. Based on the received state information for the one or more SCells, MN 620 may determine whether the SCG has been activated. For instance, the state information includes an activated state of a SCell within the SCell(s). Then, based on the activated state of the SCell within the SCell(s), MN 620 may determine that the SCG has been activated.

Optionally, the SN Modification Required Message in operation 601 may further include an explicit indicator to activate the SCG. The explicit indicator to activate the SCG may also be named as an indicator for initiating a SCG activation procedure or the like.

In operation 602, MN 620 transmits RRCReconfiguration Message, which includes the state information for the SCell(s) to activate the SCG, to UE 610 (e.g., UE 101 as illustrated and shown in FIG. 1). For example, the state information for the SCell(s) includes an activated state of a SCell within the SCell(s). Optionally, the RRCReconfiguration Message may further include the explicit indicator to activate the SCG (i.e., the indicator for initiating a SCG activation procedure).

In operation 603, UE 610 transmits RRCReconfiguration-Complete Message to MN 620. In operation 604, MN 620 transmits SN Modification Confirm Message to SN 630.

Details described in all other embodiments of the present application (for example, details of a SCG deactivation mechanism in a MR-DC scenario) are applicable for the embodiments of FIG. 6. Moreover, details described in the embodiments of FIG. 6 are applicable for all the embodiments of FIGS. 1-5, 7, and 8.

Figure 7:
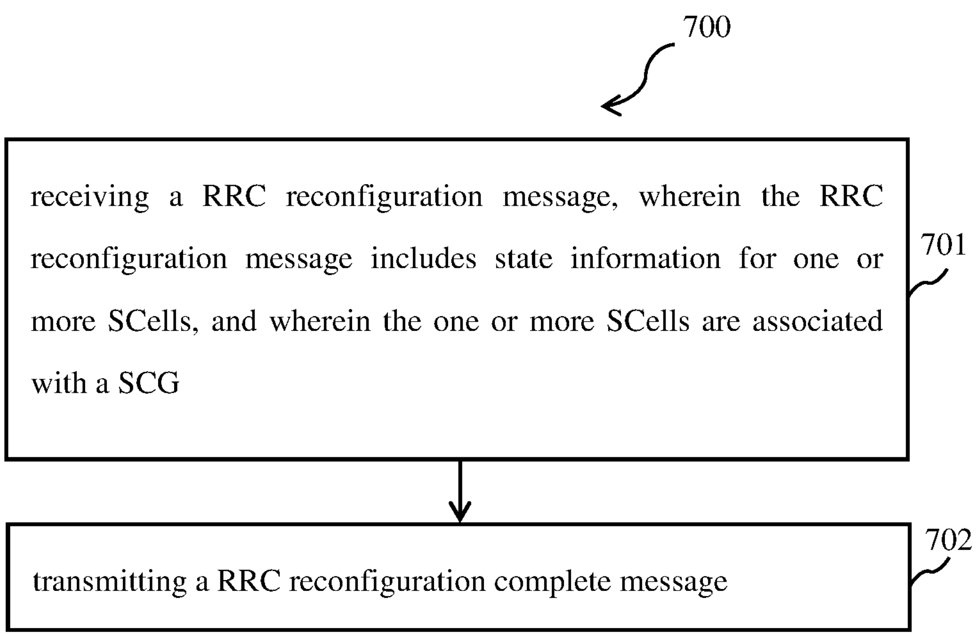
FIG. 7 illustrates a flow chart of a method for receiving state information for SCell(s) in accordance with some embodiments of the present application.

FIG. 7 illustrates a flow chart of a method for receiving state information for SCell(s) in accordance with some embodiments of the present application. The exemplary method 700 may be performed by a UE (e.g., UE 101, UE 310, UE 410, UE 510, or UE 610, as shown and illustrated in any of FIGS. 1 and 3-6). Although described with respect to a UE, it should be understood that other device(s) may be configured to perform the method as shown and illustrated in FIG. 7.

In the exemplary method 700 as shown in FIG. 7, in operation 701, a UE (e.g., UE 101 as shown and illustrated in FIG. 1) receives a RRC reconfiguration message (e.g., RRCReconfiguration Message). The RRC reconfiguration message includes state information for SCell(s) which are associated with a SCG. Contents included in the state information for the SCell(s) as shown and illustrated in FIG. 2 are applicable for the state information for the SCell(s) in operation 701.

In an embodiment, the state information for the SCell(s) includes: an activated state of a SCell; a deactivated state of a SCell; or a dormant state of a SCell. The state information for the SCell(s) may be decided by a SN (e.g., SN 103 as illustrated and shown in FIG. 1). In an example, the state information for the SCell(s) is directly transmitted from the SN to the UE if SRB3 is configured. In a further example, the state information for the SCell(s) is transmitted from the SN to the UE via a master node (MN) if the SRB3 is not configured.

In one embodiment, the RRC reconfiguration message is generated by a MN (e.g., MN 102 as illustrated and shown in FIG. 1) and includes information provided by a SN (e.g., SN 103 as illustrated and shown in FIG. 1). In another embodiment, the RRC reconfiguration message is generated by the SN as a container (e.g., an OCTET string container) and forwarded from the SN to the MN.

In operation 702, the UE transmits a RRC reconfiguration complete message (e.g., RRCReconfigurationComplete Message).

In some embodiments of FIG. 7, if the SCG has been deactivated and if the UE receives configuration information regarding the UE's behaviour(s), the UE continues a RRM measurement operation.

In an embodiment, if a measurement result(s) of the RRM measurement operation indicates that a current link quality of the UE is worse than a threshold, the UE may start at least one of: a RLM measurement operation; a beam failure detection operation; and a beam failure recovery operation.

In a further embodiment, if the measurement result(s) of the RRM measurement operation indicates that the current link quality of the UE is the same as or better than the threshold, the UE may stop at least one of: the RLM measurement operation; the beam failure detection operation; and the beam failure recovery operation.

In some embodiments of FIG. 7, the UE may receive a message indicating that a SCell of the SCG is activated. After receiving the message, the UE may check whether the SCG has been deactivated. If the SCG has been deactivated, the UE may activate the SCG. For example, during activating the SCG, the UE may start a random access (RA) procedure to the SCG.

In particular, in an embodiment, the MN or the SN can activate the SCG, which has been deactivated, by activating a SCell within the SCG, e.g., by setting the SCell state as "activated." In this embodiment, there is no need to explicitly indicate the exact SCG activation or deactivation indicator. In conventional solutions, an explicit SCG (de)activation indicator is used when the MN or the SN decides to (de)activate the SCG. From a UE's point of view, after receiving the RRCReconfiguration Message from the MN and indicating that a SCell belonging to the SCG is activated, the UE will firstly check if the relevant SCG is currently deactivated. If the SCG is currently deactivated, the UE will activate the SCG, e.g., by starting a RA procedure to the SCG.

Details described in all other embodiments of the present application (for example, details of a SCG activation mechanism in a MR-DC scenario) are applicable for the embodiments of FIG. 7. Moreover, details described in the embodiments of FIG. 6 are applicable for all the embodiments of FIGS. 1-6 and 8.

Figure 8:
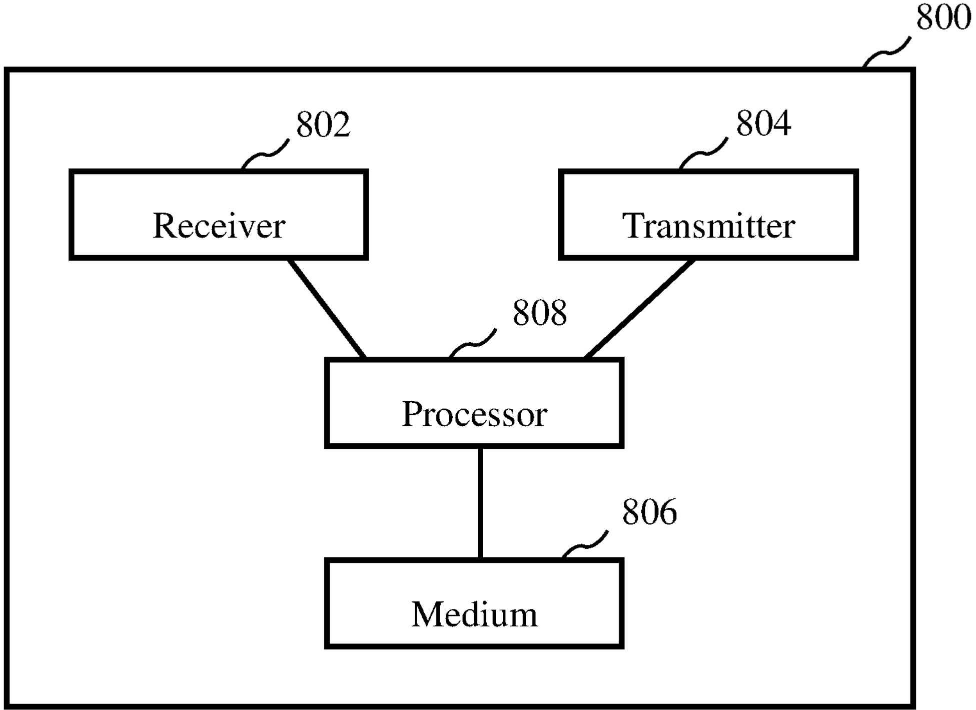
FIG. 8 illustrates an exemplary block diagram of an apparatus in accordance with some embodiments of the present application.

FIG. 8 illustrates an exemplary block diagram of an apparatus in accordance with some embodiments of the present application. In some embodiments of the present application, the apparatus 800 may be a UE, a MN, or a SN, which can at least perform the method illustrated in any of FIGS. 2-7.

As shown in FIG. 8, the apparatus 800 may include at least one receiver 802, at least one transmitter 804, at least one non-transitory computer-readable medium 806, and at least one processor 808 coupled to the at least one receiver 802, the at least one transmitter 804, and the at least one non-transitory computer-readable medium 806.

Although in FIG. 8, elements such as the at least one receiver 802, the at least one transmitter 804, the at least one non-transitory computer-readable medium 806, and the at least one processor 808 are described in the singular, the plural is contemplated unless limitation to the singular is explicitly stated. In some embodiments of the present application, the at least one receiver 802 and the at least one transmitter 804 are combined into a single device, such as a transceiver. In certain embodiments of the present application, the apparatus 800 may further include an input device, a memory, and/or other components.

In some embodiments of the present application, the at least one non-transitory computer-readable medium 806 may have stored thereon computer-executable instructions which are programmed to implement the operations of the methods, for example as described in view of any of FIGS. 2-7, with the at least one receiver 802, the at least one transmitter 804, and the at least one processor 808.

Those having ordinary skills in the art would understand that the operations of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, those having ordinary skills in the art would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including."

What is claimed is:

1. A radio access node for wireless communication, comprising:

at least one memory; and at least one processor coupled with the at least one memory and configured to cause the radio access node to:

transmit, in response to determining to activate a secondary cell group (SCG), respective state information for each secondary cell (SCell) of multiple SCells associated with the SCG; and transmit, in response to determining to deactivate the SCG, the respective state information and configuration information regarding a behavior of a user equipment (UE), wherein the configuration information regarding the behavior of the UE includes information indicating whether the UE performs a beam failure detection operation when the SCG is deactivated.

2. The radio access node of claim 1, wherein the radio access node comprises a master node (MN) or a secondary node (SN).

3. The radio access node of claim 1, wherein the respective state information includes at least one of:

an activated state of a SCell within the multiple SCells;

a deactivated state of the SCell; or a dormant state of the SCell.

4. The radio access node of claim 1, wherein the respective state information includes at least one of:

a mapping relationship between: each SCell of the multiple SCells, and a target state of each SCell of the multiple SCells after activating the SCG;

a mapping relationship between: each SCell of the multiple SCells, a target state of each SCell of the multiple SCells after deactivating the SCG, and the configuration information regarding the behavior of the UE;

a mapping relationship between: each SCell in a first subset of the multiple SCells and a target state of each SCell in the first subset after activating the SCG; or a mapping relationship between: each SCell in a second subset of the multiple SCells, a target state of each SCell in the second subset after deactivating the SCG, and the configuration information regarding the behavior of the UE.

5. The radio access node of claim 1, wherein the at least one processor is configured to cause the radio access node to:

receive, from a secondary node (SN), the respective state information;

determine, based on the respective state information, whether the SCG has been activated; and determine, in response to the respective state information including an activated state of a SCell within the multiple SCells, that the SCG has been activated.

6. The radio access node of claim 1, wherein the at least one processor is configured to cause the radio access node to, in response to determining to activate the SCG: transmit the respective state information to the UE, and wherein the respective state information includes an activated state of a SCell within the multiple SCells.

7. The radio access node of claim 1, wherein the at least one processor is configured to cause the radio access node to, in response to determining to deactivate the SCG:

receive, from a secondary node (SN), at least one of:

the configuration information regarding the behavior of the UE; or the respective state information; and transmit, to the UE, the at least one of:

the configuration information regarding the behavior of the UE; or the respective state information.

8. The radio access node of claim 1, wherein in response to determining to activate the SCG, the at least one processor is configured to cause the radio access node to: transmit the respective state information to a master node (MN), and wherein the respective state information includes an activated state of a SCell within the multiple SCells.

9. The radio access node of claim 1, wherein the at least one processor is configured to cause the radio access node to:

transmit to a master node (MN), in response to determining to deactivate the SCG, at least one of:

the configuration information regarding the behavior of the UE; or the respective state information.

10. A method performed by a radio access node, the method comprising:

transmitting, in response to determining to activate a secondary cell group (SCG), respective state information for each secondary cell (SCell) of multiple-SCells associated with the SCG; and transmitting, in response to determining to deactivate the SCG, the respective state information and configuration information regarding a behavior of a user equipment (UE), wherein the configuration information regarding the behavior of the UE includes information indicating whether the UE performs a beam failure detection operation when the SCG is deactivated.

11. The method of claim 10, wherein the method is performed by a master node (MN) or a secondary node (SN).

12. The method of claim 10, wherein the respective state information includes one of:

an activated state of a SCell within the multiple SCells;

a deactivated state of the SCell; or a dormant state of the SCell.

13. The method of claim 10, wherein the respective state information:

a mapping relationship between: each SCell of the multiple SCells, and a target state of each SCell of the multiple SCells after activating the SCG;

a mapping relationship between: each SCell of the multiple SCells, a target state of each SCell of the multiple SCells after deactivating the SCG, and the configuration information regarding the behavior of the UE;

a mapping relationship between: each SCell in a first subset of the multiple SCells and a target state of each SCell in the first subset after activating the SCG; or a mapping relationship between: each SCell in a second subset of the multiple SCells, a target state of each SCell in the second subset after deactivating the SCG, and the configuration information regarding the behavior of the UE.

14. The method of claim 10, further comprising:

receiving, from a secondary node (SN), the respective state information;

determining, based on the respective state information, whether the SCG has been activated; and determining, in response to the respective state information including an activated state of a SCell within the multiple SCells, that the SCG has been activated.

15. The method of claim 10, further comprising:

transmitting, in response to determining to activate the SCG, the respective state information to the UE, wherein the respective state information includes an activated state of a SCell within the multiple SCells.

16. The method of claim 10, further comprising:

receiving, from a secondary node (SN) and in response to determining to deactivate the SCG, at least one of:

the configuration information regarding the behavior of the UE; or the respective state information; and transmitting, to the UE, the at least one of:

the configuration information regarding the behavior of the UE; or the respective state information.

17. The method of claim 10, further comprising:

transmitting, in response to determining to activate the SCG, the respective state information to a master node (MN), wherein the respective state information includes an activated state of a SCell within the multiple SCells.

18. A processor for wireless communication, comprising:

at least one controller coupled with at least one memory and configured to cause the processor to:

transmit, in response to determining to activate a secondary cell group (SCG), respective state information for each secondary cell (SCell) of multiple SCells associated with the SCG; and transmit, in response to determining to deactivate the SCG, the respective state information and configuration information regarding a behavior of a user equipment (UE), wherein the configuration information regarding the behavior of the UE includes information indicating whether the UE performs a beam failure detection operation when the SCG is deactivated.

19. The processor of claim 18, wherein the processor comprises a master node (MN) or a secondary node (SN).

20. The processor of claim 18, wherein the respective state information includes at least one of:

an activated state of a SCell within the multiple SCells;

a deactivated state of the SCell; or a dormant state of the SCell.

* * * * *